US012633115B2

(12) United States Patent
Lee et al.

(10) Patent No.: US 12,633,115 B2
(45) Date of Patent: May 19, 2026

(54) IMAGE RECOGNITION METHOD AND UNMANNED AERIAL VEHICLE SYSTEM

(71) Applicant: Coretronic Corporation, Hsin-Chu (TW)

(72) Inventors: Cheng-Hsin Lee, Hsin-Chu (TW); Huang-Cheng Chiang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 272 days.

(21) Appl. No.: 17/585,580

(22) Filed: Jan. 27, 2022

(65) Prior Publication Data

US 2022/0245938 A1 Aug. 4, 2022

(30) Foreign Application Priority Data

Jan. 29, 2021 (CN) .......................... 202110123677.4

(51) Int. Cl.
*G06V 20/17* (2022.01)
*B64U 101/30* (2023.01)
(Continued)

(52) U.S. Cl.
CPC ................ *G06V 20/17* (2022.01); *G06T 3/40* (2013.01); *G06V 10/764* (2022.01); *G06V 20/182* (2022.01); *B64U 2101/30* (2023.01)

(58) Field of Classification Search
CPC ..... B64U 2101/30; G06F 18/214; G06T 3/40; G06V 10/764; G06V 20/17; G06V 20/182
See application file for complete search history.

(56) References Cited

U.S. PATENT DOCUMENTS

2018/0182109 A1 6/2018 Sun et al.
2020/0302168 A1* 9/2020 Vo ........................... H04N 7/183
(Continued)

FOREIGN PATENT DOCUMENTS

CN 102542295 10/2013
CN 104700399 6/2015
(Continued)

OTHER PUBLICATIONS

Saha et al. "A newly proposed object detection method using faster R-CNN inception with ResNet based on Tensorflow." Real-Time Image Processing and Deep Learning 2019. vol. 10996. SPIE, 2019. (Year: 2019).*
(Continued)

*Primary Examiner* — Katrina R Fujita
(74) *Attorney, Agent, or Firm* — JCIPRNET

(57) ABSTRACT

An image recognition method and an unmanned aerial vehicle system are provided. A training image marked with a specified range is received, and a plurality of features are extracted from the training image through a basic model to obtain a feature map. Next, a frame selection is performed on each point on the feature map to obtain a plurality of initial detection frames, and a plurality of candidate regions are selected in the initial detection frames based on the specified range. Thereafter, the obtained candidate regions are classified to obtain a target block, feature data corresponding to the target block is extracted from the feature map, and a parameter of the basic model is adjusted based on the extracted feature data. In the disclosure, a higher-resolution image is achieved, time flexibility is provided, and accuracy of image recognition is thereby improved.

14 Claims, 3 Drawing Sheets

(51) Int. Cl.
    *G06T 3/40*         (2024.01)
    *G06V 10/764*     (2022.01)
    *G06V 20/10*      (2022.01)

(56)             References Cited

U.S. PATENT DOCUMENTS

| | | | | |
|---|---|---|---|---|
| 2021/0166367 A1* | 6/2021 | Han | | G06T 7/97 |
| 2021/0209368 A1* | 7/2021 | Hao | | G06V 10/82 |
| 2021/0319242 A1* | 10/2021 | Cholakkal | | G06N 3/08 |
| 2021/0390717 A1* | 12/2021 | Fukuda | | G01S 17/89 |
| 2021/0398289 A1* | 12/2021 | Schmidt | | G06N 3/045 |

FOREIGN PATENT DOCUMENTS

| | | | | |
|---|---|---|---|---|
| CN | 106845498 | | 6/2017 | |
| CN | 108305214 | | 7/2018 | |
| CN | 109241902 | | 1/2019 | |
| CN | 109635726 | | 4/2019 | |
| CN | 109840483 | | 6/2019 | |
| CN | 110008854 A | * | 7/2019 | ......... G06K 9/00651 |
| CN | 110232683 | | 9/2019 | |
| CN | 111563408 | | 8/2020 | |
| CN | 111898419 | | 11/2020 | |
| TW | 202027033 | | 7/2020 | |
| WO | 2020164270 | | 8/2020 | |
| WO | 2020164282 | | 8/2020 | |

OTHER PUBLICATIONS

He et al. "Mask R-CNN." 2017 IEEE International Conference on Computer Vision (ICCV). IEEE, 2017. (Year: 2017).*

Ren et al. "Faster r-cnn: Towards real-time object detection with region proposal networks." Advances in neural information processing systems 28 (2015). (Year: 2015).*

Wang, H-C. "General Deep Learning segmentation process used in Remote Sensing images." The International Archives of the Photogrammetry, Remote Sensing and Spatial Information Sciences 43 (Aug. 2020): 1289-1296. (Year: 2020).*

Cui et al. "Landslide image captioning method based on semantic gate and bi-temporal LSTM." ISPRS International Journal of Geo-Information 9.4 (2020): 194. (Year: 2020).*

Chen et al. "Mapping post-earthquake landslide susceptibility: A U-Net like approach." Remote Sensing 12.17 (2020): 2767. (Year: 2020).*

Ye et al. "Landslide detection of hyperspectral remote sensing data based on deep learning with constrains." IEEE Journal of Selected Topics in Applied Earth Observations and Remote Sensing 12.12 (2019): 5047-5060. (Year: 2019).*

Zhang et al. "Automatic extraction of seismic landslides in large areas with complex environments based on deep learning: An example of the 2018 iburi earthquake, Japan." Remote Sensing 12.23 (2020): 3992. (Year: 2020).*

Shao et al. "Improved faster R-CNN traffic sign detection based on a second region of interest and highly possible regions proposal network." Sensors 19.10 (2019): 2288. (Year: 2019).*

Wang; Hsuan-Chung et al., "General Deep Learning Segmentation Process Used in Remote Sensing Images", The International Archives of the Photogrammetry, Remote Sensing and Spatial Information Sciences, Aug. 14, 2020, pp. 1289-1296, vol. 43.

"Office Action of China Counterpart Application", issued on Apr. 18, 2024, p1-p9.

* cited by examiner

100

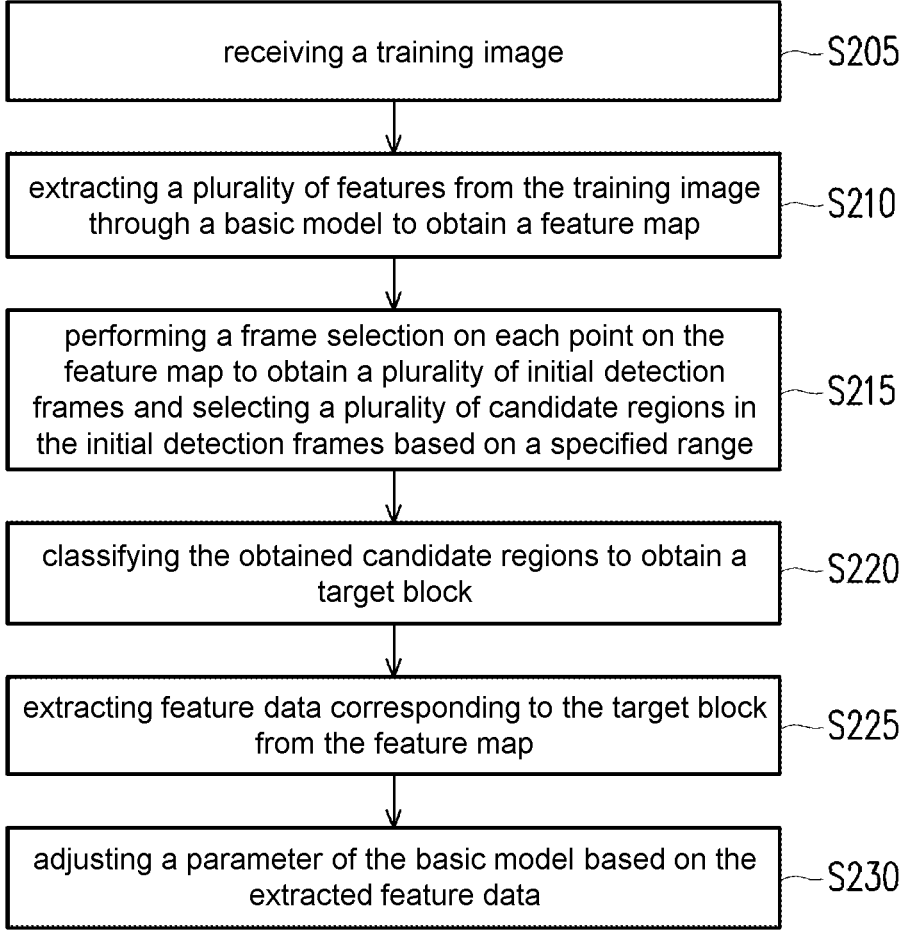

receiving a training image ∽S205 extracting a plurality of features from the training image through a basic model to obtain a feature map ∽S210 performing a frame selection on each point on the feature map to obtain a plurality of initial detection frames and selecting a plurality of candidate regions in the initial detection frames based on a specified range ∽S215 classifying the obtained candidate regions to obtain a target block ∽S220 extracting feature data corresponding to the target block from the feature map ∽S225 adjusting a parameter of the basic model based on the extracted feature data ∽S230

FIG. 2

IMAGE RECOGNITION METHOD AND UNMANNED AERIAL VEHICLE SYSTEM

CROSS-REFERENCE TO RELATED APPLICATION

This application claims the priority benefit of China application serial no. 202110123677.4, filed on Jan. 29, 2021. The entirety of the above-mentioned patent application is hereby incorporated by reference herein and made a part of this specification.

BACKGROUND

Technical Field

The disclosure relates to an image recognition technique, and in particular, to an image recognition method using an unmanned aerial vehicle and an unmanned aerial vehicle system.

Description of Related Art

With the advancement of science and technology, increasing advanced technologies are applied to the detection and prevention of natural disasters. Taiwan is located in an area where earthquakes and typhoons occur frequently, and every natural disaster is likely to lead to mountain landslides and cause damages. Landslide detection has always been an important topic of disaster prevention, which may be generally divided into pre-prevention and post-mortem investigation. Pre-prevention is to use various sensors to predict regions that may collapse and issue warnings in advance. Detection manners may vary depending on the sensors used. The sensors may be generally divided into three types: rangefinders, wireless sensors, and imagefinders. The rangefinders are, for example, LiDAR or infrared. The wireless sensors are, for example, motion measurement sensors including accelerometers and gyroscopes.

When a rangefinder is used to detect a landslide, a three-dimensional model is required to be established first, and whether a collapse occurs is estimated according to the changes in the landform before and after the collapse. Although a rangefinder is not interfered by vegetation, it takes a long time to build the model, and data needs to be collected within the measurement range of the rangefinder. That is, carpet mapping needs to be performed on the target region. Therefore, tremendous amount of time is required to be spent on implementation.

In the case of using wireless sensors for landslide detection, a wireless sensor sends the signal indicating that whether there is displacement on the ground through the wireless network. Therefore, a large-scale implementation is required to achieve the detection effect. In other words, a large number of sensors need to be set up under a wide range of measurements, and a lot of work is required for construction and maintenance.

When using an imagefinder to detect landslides, the images generally used are remote sensing pictures. Remote sensing may be divided into airborne remote sensing and satellite-borne remote sensing. The airborne remote sensing is the observation of the ground by an aircraft carrying a charge-coupled device (CCD) camera or a non-digital camera and the like. Satellite-borne remote sensing means that sensors are placed on satellites outside the atmosphere. At present, in the general image landslide detection, high-precision satellite images are used, but since the height of image capturing is considerably high, the resolution of the obtained data is limited. For instance, assuming the resolution is five meters, one pixel on the satellite image actually represents 25 square meters (5 meters×5 meters). Satellite images can provide photos taken at several different wavelengths. Because the degree of reflection of light of different wavelengths is different for different substances, the object to be observed may be obtained by cross-comparing different images. In many studies, satellite images are used together with machine learning methods to perform landslide detection. Nevertheless, the main disadvantage of using satellite imagery at present is that the image acquisition is limited by the operation of the satellites, and the resolution of the satellite images is not high enough as well. At present, in many satellite images, it is claimed that the frequency of image-capturing of the same location is one day, that is, the satellites can return to their original positions one day later; nevertheless, data transmission and image processing are required to acquire the captured images. Further, satellite imagery also has military considerations. There will be a time difference of several days in obtaining the present image most of the time, so after a natural disaster occurs, there is no way to assess the landslide situation in real time. Moreover, the resolution of satellite images is limited at present, and there is still room for improvement in the accuracy of landslide detection.

The information disclosed in this BACKGROUND section is only for enhancement of understanding of the background of the described technology and therefore it may contain information that does not form the prior art that is already known to a person of ordinary skill in the art. Further, the information disclosed in the BACKGROUND section does not mean that one or more problems to be resolved by one or more embodiments of the disclosure was acknowledged by a person of ordinary skill in the art.

SUMMARY

The disclosure provides an image recognition method and an unmanned aerial vehicle system capable of providing improved recognition accuracy in an application of landslide detection.

The disclosure provides an image recognition method, and the method includes the following steps. A training image is received, and a specified range is marked in the training image. A plurality of features are extracted from the training image through a basic model to obtain a feature map. A frame selection is performed on each point on the feature map to obtain a plurality of initial detection frames, and a plurality of candidate regions are selected in the initial detection frames based on the specified range. The obtained candidate regions are classified to obtain a target block. Feature data corresponding to the target block is extracted from the feature map. A parameter of the basic model is adjusted based on the extracted feature data.

The disclosure further provides an unmanned aerial vehicle system including image capturing equipment, an unmanned aerial vehicle equipped with the image capturing equipment, and a computing apparatus. A basic model is trained by the computing apparatus. An image to be recognized is received from the image capturing equipment through a transmission manner, and a target block in the image to be recognized is predicted by using the basic model. In the basic model, a training image is received from the image capturing equipment, and a specified range is marked in the training image. A plurality of features are extracted by the computing apparatus from the training image through a basic model to obtain a feature map. A frame selection is performed on each point on the feature map by the computing apparatus to obtain a plurality of initial detection frames, and a plurality of candidate regions are selected in the initial detection frames based on the specified range. The obtained candidate regions are classified by the computing apparatus to obtain a target block. Feature data corresponding to the target block is extracted by the computing apparatus from the feature map. A parameter of the basic model is adjusted by the computing apparatus based on the extracted feature data.

To sum up, in the disclosure, the unmanned aerial vehicle is used together with the deep learning technique of image recognition, and considerable flexibility is thereby provided. Before and after the disaster, the unmanned aerial vehicle can be taken off at any time for landslide inspection. Further, a higher-resolution image is achieved with the use of the unmanned aerial vehicle to take photos, accuracy of recognition is therefore improved.

Other objectives, features and advantages of the disclosure will be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2 is a flow chart of an image recognition method according to an embodiment of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
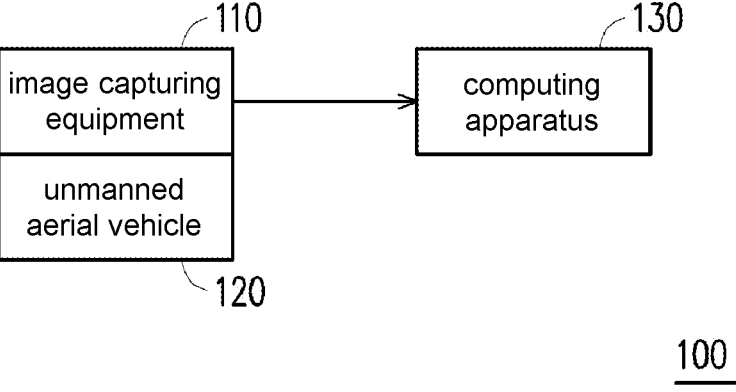
FIG. 1 is a block view of an unmanned aerial vehicle system according to an embodiment of the disclosure.

FIG. 1 is a block view of an unmanned aerial vehicle system according to an embodiment of the disclosure. With reference to FIG. 1, an unmanned aerial vehicle system 100 includes image capturing equipment 110, an unmanned aerial vehicle 120, and a computing apparatus 130. The unmanned aerial vehicle 120 is equipped with the image capturing equipment 110. The image capturing equipment 110 is a video camera or a camera and the like that uses, for example, a charge coupled device (CCD) lens and a complementary metal oxide semiconductor transistor (CMOS), to obtain an image.

The computing apparatus 130 is, for example, an electronic apparatus with computing functions such as a server, a personal computer, a tablet computer, and a smart phone, and has a processor and a storage device. The computing apparatus 130 receives image information from the unmanned aerial vehicle 120 through a wireless transmission manner. The wireless transmission manner is a manner known to a person having ordinary skill in the art, and description thereof is thus not provided herein. The processor is, for example, a central processing unit (CPU), a graphic processing unit (GPU), a physics processing unit (PPU), a programmable microprocessor, an embedded control chip, a digital signal processor (DSP), an application specific integrated circuit (ASIC), or other similar devices. The storage device may be implemented as a fixed or a movable random access memory in any form, a read-only memory, a flash memory, a secure digital card, a hard disk, other similar devices, or a combination of the foregoing devices. One or more code segments are stored in the storage device, and the code segments are executed by the processor to complete an image recognition method provided as follows. In the embodiments provided as follows, a faster region-based convolutional neural network (faster R-CNN) framework is adopted, and two-stage detection is used for image recognition. That is, an object position is detected first and classification is then performed.

FIG. 2 is a flow chart of an image recognition method according to an embodiment of the disclosure. With reference to FIG. 1 and FIG. 2 together, in step S205, a training image is received. Herein, a specified range is marked in the training image. Regarding data collection, the unmanned aerial vehicle 120 is configured to cruise in a region where landslides may occur, and the equipped image capturing equipment 110 is configured to take pictures of the environment. After data is collected, a side slope is marked first. The training image further includes a specified category corresponding to the marked specified range. The specified category includes one of landslides, rivers, and roads.

Besides, a data augmentation manner may also be used to obtain the training image. Further, resolution of an input image obtained by the image capturing equipment 110 during aerial photography is high. If the input image is directly inputted to a basic model, a considerable amount of memory space is required. Therefore, a size of the input image may be reduced by a same proportion first, and data augmentation may then be performed on the scaled-down input image to obtain a plurality of the training images. Data augmentation includes different strategies, such as rotation, color adjustment, mirroring, translation or deformation of a target region, and so on.

After obtaining the training images, the processor may further receive an operation through input equipment, so as to perform a frame selection on a range to be marked on a training image and adjust such range to the specified range of a regular shape. Herein, the regular shape is, for example, a square.

Figure 3A:
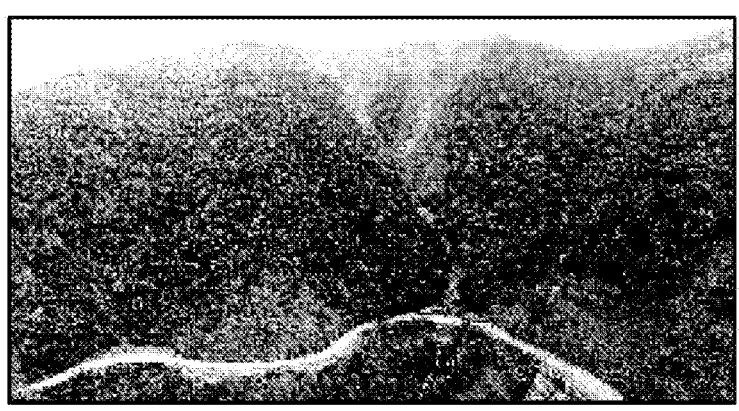
FIG. 3A and FIG. 3B are schematic views of training images according to an embodiment of the disclosure.
Figure 3B:
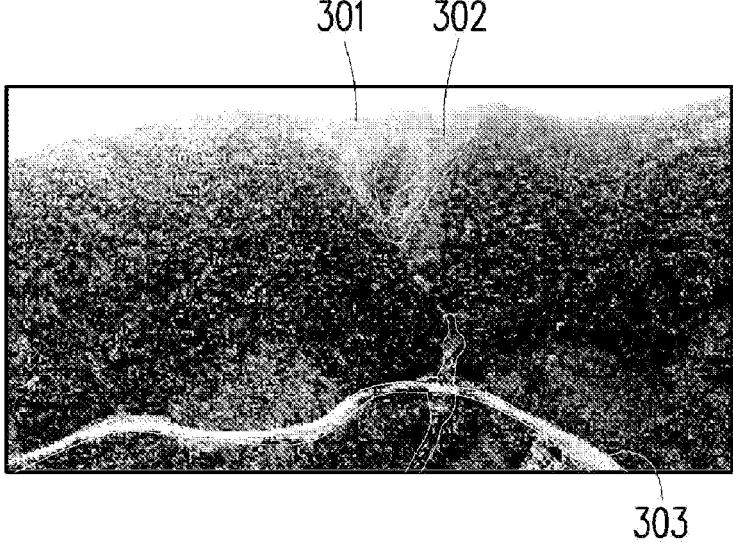

FIG. 3A and FIG. 3B are schematic views of training images according to an embodiment of the disclosure. FIG. 3A is an original image which is not marked, and FIG. 3B is a training image which is marked. As shown in FIG. 3B, ranges 301, 302, and 303 are obtained through manual marking. Further, in this embodiment, the specified category corresponding to both the ranges 301 and 302 is landslides, and the specified category corresponding to the range 303 is roads. After obtaining the ranges 301, 302, and 303, the processor may generate specified ranges of regular shapes based on the ranges 301, 302, and 303. For instance, regarding the range 301, a longest width and a longest height of the range 301 are respectively treated as a length and a width of the corresponding specified range. Herein, the specified ranges may overlap.

Next, in step S210, a plurality of features are extracted from the training image through the basic model to obtain a feature map. The choice of the basic model may affect the ability of model feature extraction. Herein, the basic model adopts an inception residual network (inception Resnet) structure. The training image is inputted to the basic model for feature extraction, and the feature map is accordingly obtained. For instance, in the faster R-CNN framework, a feature value of each region in the training image is extracted to act as input, and the corresponding feature map is then extracted through a convolution kernel operation in a convolution layer. Each point on the feature map may be treated as a feature of a corresponding region in the original training image.

Next, in step S215, a frame selection is performed on each point on the feature map to obtain a plurality of initial detection frames, and a plurality of candidate regions are selected in the initial detection frames based on the specified range. Herein, in the faster R-CNN framework, the initial detection frames with shapes corresponding to a plurality of filter panes are extracted by treating each point on the feature map as a center point. It is assumed that the filter panes include basic regions of 9 types (anchors), which are obtained by a combination of three sizes and three lengths and widths and are specified ranges corresponding to different shapes. 9 initial detection frames are extracted for each point on the feature map by using the 9 types of the filter panes. After the initial detection frames of all points are obtained, an initial detection frame among the initial detection frames that is most consistent with each specified range marked in the training image is selected as the candidate region. After the candidate regions are selected, a non-maximum suppression algorithm is used to filter the candidate regions, and subsequent classification is performed on the retained candidate regions.

In the embodiment, two-stage detection is adopted, and an object position (candidate region) is detected first and is then classified. That is, candidate regions that may have landslide regions are selected, and these candidate regions are then classified from the original feature map to determine whether these candidate regions are landslide regions. An advantage thereof is accuracy.

Thereafter, in step S220, the obtained candidate regions are classified to obtain a target block. With the selected candidate regions, a feature corresponding to each of the candidate regions is extracted from the original feature map. Final region correction and classification are performed on these candidate regions, so as to select the target block among the candidate regions. In terms of landslide detection, landslides and roads and rivers have similar features. Although the purpose is to recognize landslides, it is found in experiments that in the case that the road and river regions are added for classification of various types, and finally only the location of the landslides is selected, the overall accuracy may improve.

Next, in step S225, feature data corresponding to the target block is extracted from the feature map. Further, in step S230, a parameter of the basic model is adjusted based on the extracted feature data. In terms of landslide detection, the target block belonging to landslides is found, and the feature data corresponding to the landslides is obtained from the feature map to adjust the parameter of the basic model.

The parameter includes at least one of a convolutional layer parameter, a fully-connected layer parameter, and an output layer parameter.

The purpose of basic model training is that when an image is inputted, the basic model can predict the location of landslides, and such prediction needs to resemble manually marked data as much as possible. Herein, a momentum optimizer may be further used to facilitate parameter adjustment, and not until the model converges does the training stops.

In addition, after parameter adjustment is completed, a recognition rate of the basic model may be further verified. That is, a plurality of test images are inputted to the basic model to obtain a plurality of output results, and whether intersections over union of the output results and specified ranges marked in the test images are greater than a default value are determined. Next, the output results with the intersections over union greater than the default value to be correct recognition to obtain the recognition rate.

In an embodiment, it is assumed that there are a total of 968 images obtained by aerial photography by the image capturing equipment 110, 774 images are used as the training images, and 194 images are used as the test images. Firstly, 194 test images are manually marked to obtain a specified range of the corresponding landslide region. Secondly, the 194 test images are inputted to the basic model one by one to obtain the final output result. Next, the output result is compared with the marked specified range. Since it is necessary to compare whether the landslide position in the output result is correct, the identification is correct if the intersection over union (IOU) of each output result and the marked specified range is set to be greater than 50%. Further, a different number of landslide regions are provided in each test image. Therefore, the correct detection is further defined as the detection of all landslides on the test image, and it is determined as correct detection. Even a landslide is redundantly detected, such detection is still considered as correct detection, and as long as one landslide is missed, it is considered an error. Verification results are shown in Table 1.

TABLE 1

| Verification Results | | Number | | Percentage | |
| --- | --- | --- | --- | --- | --- |
| Correct Detection | no misjudgment | 175 | 164 | 90% | 85% |
| | redundant detection | | 11 | | 5% |
| Missed Detection | at least one missed | 19 | 18 | 10% | 9% |
| | all missed | | 1 | | 1% |

In view of the foregoing, in the embodiments, the advantage of using the image capturing equipment together with the unmanned aerial vehicle for landslide detection is flexibility. Before and after the disaster, the unmanned aerial vehicle can be taken off at any time for landslide inspection. Further, the unmanned aerial vehicle itself has a global positioning system (GPS) that can record the location of the photo. When a landslide is detected, the region where the landslide occurred can be known, an early warning map may thus be accordingly established. A higher-resolution image is achieved with the use of the unmanned aerial vehicle to take photos, time flexibility is provided, and accuracy of image recognition is thereby improved. In addition, through the embodiments, after the collapse occurs, the landslide region may be known as soon as possible, and contingency measures may then be made.

The above are exemplary embodiments of the disclosure and should not be construed as limitations to the scope of the disclosure. That is, any simple change or modification made based on disclosure of the claims and specification of the disclosure falls within the scope of the disclosure. Any of the embodiments or any of the claims of the disclosure does not necessarily achieve all of the advantages or features disclosed by the disclosure. Moreover, the abstract and the title are merely used to aid in search of patent files and are not intended to limit the scope of the claims of the disclosure. In addition, terms such as "first" and "second" in the specification or claims are used only to name the elements or to distinguish different embodiments or scopes and should not be construed as the upper limit or lower limit of the number of any element.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image recognition method, comprising following steps:

receiving a training image, wherein a plurality of specified ranges are marked in the training image;

extracting a plurality of features from the training image through a basic model to obtain a feature map;

performing a frame selection on each point on the feature map to obtain a plurality of initial detection frames and selecting a number of initial detection frames from the plurality of initial detection frames, such that the number of the selected initial detection frames corresponds to a number of the plurality of specified ranges, as a plurality of candidate regions;

extracting a feature corresponding to each of the plurality of candidate regions from the feature map and performing region correction and classification on the plurality of candidate regions to obtain a target block having a detection target selected from the plurality of candidate regions;

extracting feature data corresponding to the target block from the feature map; and adjusting a parameter of the basic model based on the extracted feature data, wherein the training image further comprises a plurality of specified categories corresponding to the marked specified ranges, and the plurality of specified categories comprise landslides, rivers, and roads, the detection target corresponds to one of the plurality of specified categories.

2. The image recognition method according to claim 1, wherein the image recognition method further comprises:

receiving an input image;

scaling down the input image; and performing data augmentation on the scaled-down input image to obtain a plurality of the training images.

3. The image recognition method according to claim 1, wherein the basic model is an inception residual network.

4. The image recognition method according to claim 1, wherein the step of performing the frame selection on each point on the feature map comprises:

extracting the initial detection frames with shapes corresponding to a plurality of filter panes by treating each point on the feature map as a center point.

5. The image recognition method according to claim 1, wherein after the step of selecting the number of initial detection frames as the plurality of candidate regions, the image recognition method further comprises:

filtering the candidate regions by using a non-maximum suppress algorithm and classifying the retained candidate regions.

6. The image recognition method according to claim 1, wherein the image recognition method further comprises:

receiving an operation to frame a range on the training image; and adjusting the range to at least one of the plurality of specified ranges of a regular shape.

7. The image recognition method according to claim 1, wherein the image recognition method further comprises: verifying a recognition rate of the basic model, which comprises:

inputting a plurality of test images to the basic model to obtain a plurality of output results;

determining whether intersections over union of the output results and the specified ranges marked in the test images are greater than a default value; and determining the output results with the intersections over union greater than the default value to be correct recognition to obtain the recognition rate.

8. An unmanned aerial vehicle system, comprising image capturing equipment, an unmanned aerial vehicle, and a computing apparatus, wherein the unmanned aerial vehicle is equipped with the image capturing equipment, and the computing apparatus is configured for:

training a basic model, wherein an image to be recognized is received from the image capturing equipment through a transmission manner, and a target block in the image to be recognized is predicted by using the basic model, wherein the step of training the basic model comprises:

receiving a training image from the image capturing equipment, wherein a plurality of specified ranges are marked in the training image;

extracting a plurality of features from the training image through a basic model to obtain a feature map;

performing a frame selection on each point on the feature map to obtain a plurality of initial detection frames and selecting a number of initial detection frames from the plurality of initial detection frames, such that the number of the selected initial detection frames corresponds to a number of the plurality of specified ranges, as a plurality of candidate regions;

extracting a feature corresponding to each of the plurality of candidate regions from the feature map and performing region correction and classification on the plurality of candidate regions to obtain a target block having a detection target selected from the plurality of candidate regions;

extracting feature data corresponding to the target block from the feature map; and adjusting a parameter of the basic model based on the extracted feature data, wherein the training image further comprises a plurality of specified categories corresponding to the marked specified ranges, and the plurality of specified categories comprise one of landslides, rivers, and roads, the detection target corresponds to one of the plurality of specified categories.

9. The unmanned aerial vehicle system according to claim 8, wherein the computing apparatus is configured for:

receiving an input image;

scaling down the input image; and performing data augmentation on the scaled-down input image to obtain a plurality of the training images.

10. The unmanned aerial vehicle system according to claim 8, wherein the basic model is an inception residual network.

11. The unmanned aerial vehicle system according to claim 8, wherein the computing apparatus is configured for:

extracting the initial detection frames with shapes corresponding to a plurality of filter panes by treating each point on the feature map as a center point.

12. The unmanned aerial vehicle system according to claim 8, wherein the computing apparatus is configured for:

filtering the candidate regions by using a non-maximum suppress algorithm and classifying the retained candidate regions.

13. The unmanned aerial vehicle system according to claim 8, wherein the computing apparatus is configured for:

receiving an operation to frame a range on the training image; and adjusting the range to at least one of the plurality of specified ranges of a regular shape.

14. The unmanned aerial vehicle system according to claim 8, wherein the computing apparatus is configured for:

verifying a recognition rate of the basic model, comprising:

inputting a plurality of test images to the basic model to obtain a plurality of output results;

determining whether intersections over union of the output results and the specified ranges marked in the test images are greater than a default value; and determining the output results with the intersections over union greater than the default value to be correct recognition to obtain the recognition rate.

* * * * *